(12) United States Patent
Baker et al.

(10) Patent No.: US 7,891,950 B2
(45) Date of Patent: *Feb. 22, 2011

(54) LIGHTWEIGHT COMPOSITE TRUSS WIND TURBINE BLADE

(75) Inventors: Myles L. Baker, Long Beach, CA (US); Cory P. Arendt, Huntington Beach, CA (US)

(73) Assignee: Modular Wind Energy, Inc., Long Beach, CA (US)

(*) Notice: Subject to any disclaimer, the term of this patent is extended or adjusted under 35 U.S.C. 154(b) by 42 days.

This patent is subject to a terminal disclaimer.

(21) Appl. No.: 12/411,259

(22) Filed: Mar. 25, 2009

(65) Prior Publication Data

US 2009/0196758 A1 Aug. 6, 2009

Related U.S. Application Data

(63) Continuation of application No. 11/725,916, filed on Mar. 20, 2007, now Pat. No. 7,517,198.

(60) Provisional application No. 60/783,551, filed on Mar. 20, 2006.

(51) Int. Cl.
*F03D 1/06* (2006.01)
(52) U.S. Cl. .................. 416/233; 29/889.6; 244/123.4
(58) Field of Classification Search ............ 244/123.4; 416/226, 233
See application file for complete search history.

(56) References Cited

U.S. PATENT DOCUMENTS

| 1,291,678 A | 1/1919 | Kleckler |
|---|---|---|
| 1,325,499 A | 12/1919 | Rapp et al. |
| 1,337,951 A | 4/1920 | Plym |
| 1,388,543 A | 8/1921 | Barling |
| 1,397,701 A | 11/1921 | Rapp et al. |
| 1,403,444 A | 1/1922 | Rapp et al. |
| 1,453,114 A | 4/1923 | Rapp et al. |
| 1,517,546 A | 12/1924 | Dunham |
| 1,852,622 A | 4/1932 | Milburn |
| 1,949,785 A | 3/1934 | De La Cierva |
| 2,219,454 A | 10/1940 | Class |

(Continued)

FOREIGN PATENT DOCUMENTS

DE 3708445 9/1988

(Continued)

OTHER PUBLICATIONS

"Wind Turbine Design;" Wikipedia, the free encyclopedia; <http://en.wikipedia.org/wiki/Wind_turbine_design> [accessed: Mar. 9, 2007]; pp. 1-8.

(Continued)

*Primary Examiner*—Richard Edgar
(74) *Attorney, Agent, or Firm*—Perkins Coie LLP

(57) ABSTRACT

A lightweight wind turbine blade formed with a truss support structure assembly of composite truss joints including composite spar and cross members attached to and supporting in spaced relation a spine of lightweight rib panels. The rib panels are oriented in parallel spaced relation from one another and individually molded with perimeters defining individual areas of curvature for the finished blade assembly. The truss support structure is covered with a lightweight fiberglass or hardened fabric skin attached to and fitted on respective rib panel edges forming an airfoil structure.

23 Claims, 8 Drawing Sheets

U.S. PATENT DOCUMENTS

| | | | |
|---|---|---|---|
| 2,386,019 A | 10/1945 | Watter | |
| 2,405,917 A | 8/1946 | Watter | |
| 3,647,318 A | 3/1972 | Pehrsson et al. | |
| 4,050,246 A | 9/1977 | Bourquardez et al. | |
| 4,130,380 A | 12/1978 | Kaiser | |
| 4,295,790 A | 10/1981 | Eggert, Jr. | |
| 4,339,230 A * | 7/1982 | Hill | 416/226 |
| 4,389,162 A | 6/1983 | Doellinger et al. | |
| 4,643,647 A | 2/1987 | Perry et al. | |
| 4,815,939 A | 3/1989 | Doble | |
| 5,269,058 A | 12/1993 | Wiggs et al. | |
| 5,284,419 A | 2/1994 | Lutz et al. | |
| 5,297,937 A | 3/1994 | Umetani et al. | |
| 5,375,324 A | 12/1994 | Wallace et al. | |
| 5,439,353 A | 8/1995 | Cook et al. | |
| 5,509,783 A | 4/1996 | Jones et al. | |
| 5,628,403 A | 5/1997 | Thomas et al. | |
| 6,237,873 B1 | 5/2001 | Amaoka et al. | |
| 6,561,459 B2 | 5/2003 | Amaoka et al. | |
| 6,890,152 B1 | 5/2005 | Thisted | |
| 6,972,498 B2 | 12/2005 | Jamieson et al. | |
| 6,974,309 B2 | 12/2005 | Seki et al. | |
| 7,105,941 B2 | 9/2006 | Hua et al. | |
| 7,118,338 B2 | 10/2006 | Moroz et al. | |
| 7,153,090 B2 | 12/2006 | DeLeonardo et al. | |
| 7,160,083 B2 | 1/2007 | Pierce et al. | |
| 7,179,059 B2 | 2/2007 | Sorensen et al. | |
| 7,186,086 B2 | 3/2007 | Yoshida et al. | |
| 7,303,365 B2 | 12/2007 | Wobben et al. | |
| 7,351,040 B2 | 4/2008 | Livingston et al. | |
| 7,393,184 B2 | 7/2008 | Cairo | |
| 7,427,189 B2 | 9/2008 | Eyb et al. | |
| 7,438,533 B2 | 10/2008 | Eyb et al. | |
| 2006/0045743 A1 | 3/2006 | Bertolotti et al. | |
| 2006/0188378 A1 | 8/2006 | Bech et al. | |
| 2006/0225278 A1 | 10/2006 | Lin et al. | |
| 2007/0025858 A1 | 2/2007 | Driver et al. | |
| 2007/0041829 A1 | 2/2007 | Bonnet | |
| 2007/0065290 A1 | 3/2007 | Herr | |
| 2007/0095008 A1 | 5/2007 | Arsene | |
| 2007/0107220 A1 | 5/2007 | Bakhuis et al. | |
| 2007/0110584 A1 | 5/2007 | Stommel | |
| 2007/0154317 A1 | 7/2007 | Cairo | |
| 2007/0183888 A1 | 8/2007 | Gunneskov et al. | |
| 2007/0217918 A1 | 9/2007 | Baker et al. | |
| 2007/0253824 A1 | 11/2007 | Eyb | |
| 2008/0107540 A1 | 5/2008 | Bonnet | |
| 2008/0112813 A1 | 5/2008 | Rochholz | |
| 2009/0191063 A1 | 7/2009 | Baker et al. | |
| 2009/0196757 A1 | 8/2009 | Baker et al. | |

FOREIGN PATENT DOCUMENTS

| | | |
|---|---|---|
| DE | 10152449 A1 | 5/2003 |
| EP | 1584817 | 10/2005 |
| EP | 1806285 | 7/2007 |
| EP | 1878915 | 1/2008 |
| FR | 258822 | 4/1987 |
| GB | 382979 | 11/1932 |
| GB | 448249 | 6/1936 |
| GB | 466665 | 6/1937 |
| GB | 582527 A | 11/1946 |
| JP | 2005299620 | 10/2005 |
| NL | 8800386 | 9/1989 |
| WO | WO-2005064156 | 7/2005 |
| WO | WO-2006002621 | 1/2006 |
| WO | WO-2006005944 | 1/2006 |
| WO | WO-2006061617 | 6/2006 |
| WO | WO-2006128940 | 12/2006 |
| WO | WO-2007045244 | 4/2007 |
| WO | WO-2007118581 | 10/2007 |

OTHER PUBLICATIONS

"Wind Turbine;" Wikipedia, the free encyclopedia; <http://en.wikipedia.org/wiki/Wind_turbine> [accessed: Mar. 9, 2007]; pp. 1-11.

Weber, Friedel; "How a High-Performance Sailplane is Manufactured;" DG Flugzeugbau GmbH; <http://dg-flugzeugbau.de/flugzeug-bauen-e.html> [accessed: Oct. 22, 2008]; pp. 1-10.

International Search Report for PCT/US2007/078361; Modular Wind Energy, Inc.; Jun. 13, 2008; pp. 1-2.

* cited by examiner

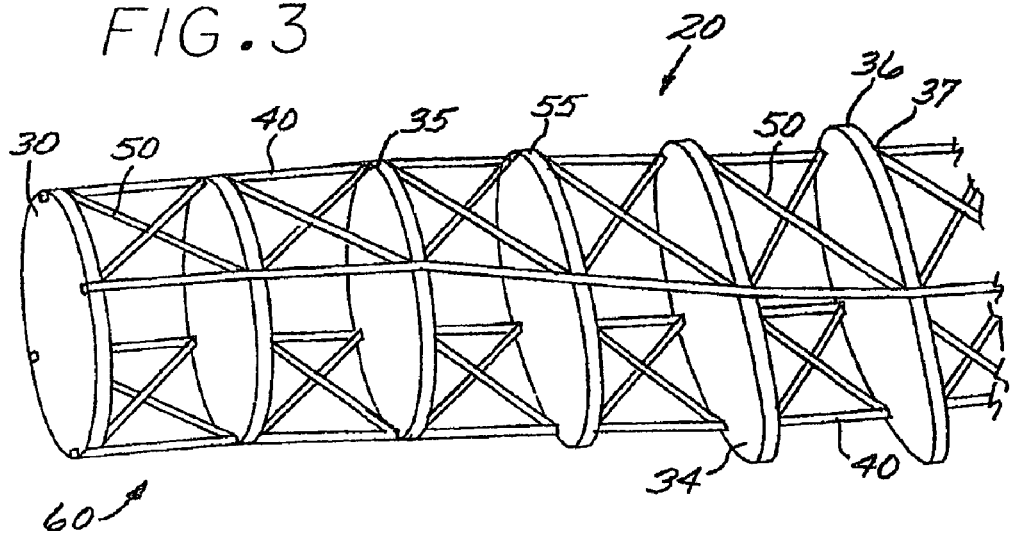
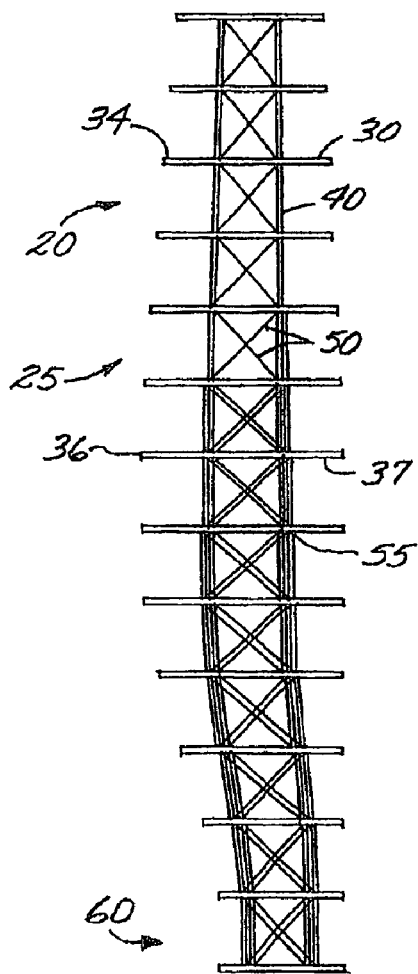
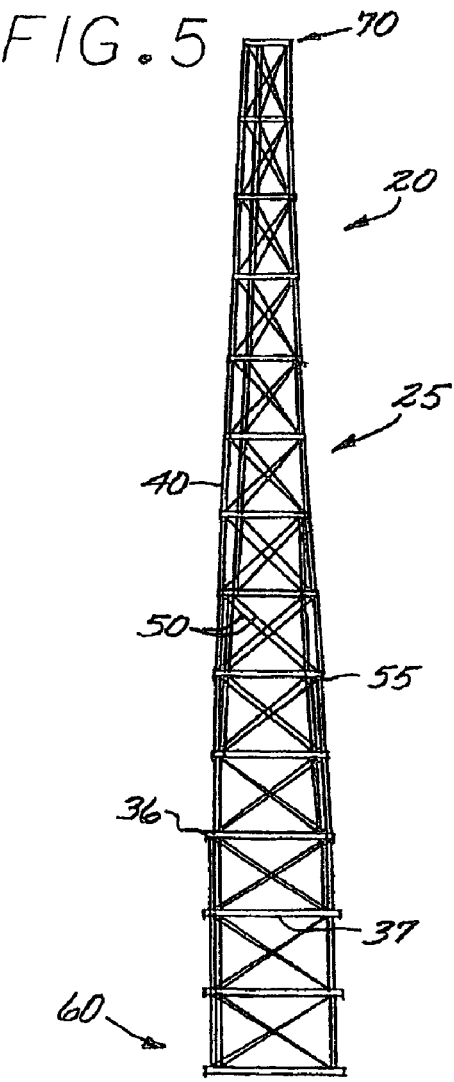

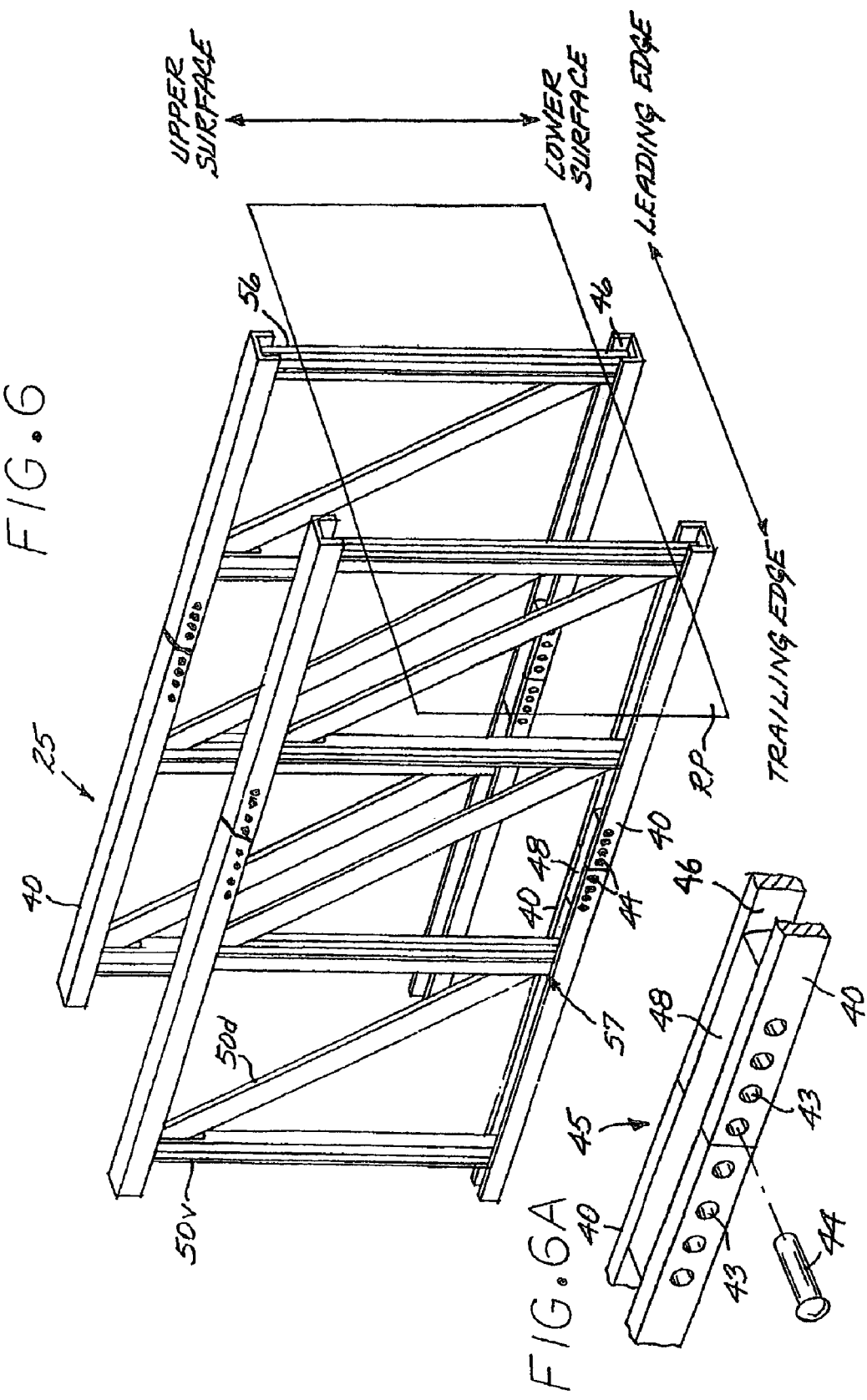

LIGHTWEIGHT COMPOSITE TRUSS WIND TURBINE BLADE

CROSS-REFERENCES TO RELATED APPLICATIONS

This application is a continuation application of commonly assigned U.S. patent application Ser. No. 11/725,916, filed on Mar. 20, 2007 now U.S. Pat. No. 7,517,198, and entitled LIGHTWEIGHT COMPOSITE TRUSS WIND TURBINE BLADE, which claims priority of U.S. Provisional Patent Application Ser. No. 60/783,551, filed Mar. 20, 2006.

FIELD OF THE INVENTION

The invention relates to airfoil core structures and specifically, wind turbine blades.

BACKGROUND OF THE INVENTION

With populations increasing and newly developed communities springing forth in previously uninhabited locales, the demand for power is testing the capacities of energy providers. New sources of fuel or power are being sought daily and sources previously considered inefficient to tap are being studied further to extract whatever power generation may be available. However, fossil fuels such as coal and petroleum, previously favored because of their abundance and inexpense are now becoming shunned because of the presumed deleterious effects their consumption has effected on the environment and their increasing costs. Additionally, there are some that feel the United States has become dependent on the production of fuel from foreign nations and thus, we should seek alternatives to these fuel sources. In response, industries are converting more machinery previously powered by petroleum-based products to electric-based power sources. Additionally, the population as a whole is becoming increasingly dependent on electrical equipment to manage our businesses, transport our workforce, and run our homes. Thus, the search for alternative energy sources is gathering increasing interest with the hope that natural power sources will provide enough clean energy to power our nation's increasing energy demands. One source expected to help meet the need for meeting the for energy production is wind power.

Wind power is the conversion of wind energy into more useful forms such as electricity. Wind energy is considered by many an ample, renewable, widely distributed and clean power source that mitigates the greenhouse effect if used to replace fossil-fuel-derived electricity. Wind power is for the most part relegated to large scale wind farms for use in national electrical grids. Small individual turbines are used for providing electricity to rural residences or grid-isolated locations because of the current structural capabilities and the economic obstacles associated with generator manufacture and territorial placement.

Most major forms of electric generation are capital intensive, meaning they require substantial investments at project inception but have low ongoing costs (generally for fuel and maintenance). This is particularly true for wind power which has minimal fuel costs and relatively low maintenance costs. However, wind power has a high proportion of up-front costs. The "cost" of wind energy per unit of production is generally based on average cost per unit, which incorporates the cost of construction (including material components), borrowed funds, return to investors, estimated annual production, among other components. These costs are averaged over the projected useful life of the equipment, which can be in excess of twenty years if the generator equipment maintains durability and efficient production. Thus, minimizing the risk of premature breakdown while extracting the most power from a given locale becomes a compelling goal when fabricating a wind power generation source. One of the most common and widely used structures for wind power extraction is a wind turbine.

A wind turbine is a machine the converts kinetic energy from the wind either into mechanical energy used directly by machinery such as a pump or is then converted into electricity which is subsequently used to power electric equipment. Wind turbines are popular sources of power because they do not rely on the burning of fossil fuels whose consumption is a known contributor to the pollution of the environment. Wind turbines are commonly separated into two types: horizontal axis wind turbines or vertical axis wind turbines. For this application, discussion will focus on a wind turbine blade for use on a horizontal axis wind turbine. Such wind turbines have a main rotor shaft and electrical generator at the top of a tower and are pointed into the wind. Common modern wind turbines are pointed into the wind and controlled by computer-controlled motors. The blades should be made stiff and strong to resist bending, shear, and torsional forces produced by strong winds. Horizontal axis wind turbines are popular amongst energy harvesters because the design of the blades and their placement are conducive to self starting and operation whenever the blades are subjected to winds.

In practice, wind generators are usually sited where the average wind speed is 10 mph or greater. An "ideal" location would have a near constant flow of non-turbulent wind throughout the year and would not suffer from excessive sudden, powerful wind gusts. Current preferred sites include windy areas such as hilly ridgelines, shorelines, and off-shore developed platforms situated in shallow waters. However, an important turbine siting consideration is access to or proximity to local demand or transmission capacity and such typical sites are distant from local demands; especially those growing demands created by burgeoning communities in flat, low wind-speed areas. Low wind-speed areas have wind power potential, however, the current technology is considered by some inefficient and/or cost prohibitive for use near to these locales.

During the general operation of a wind turbine, the air that passes over the upper camber of an airfoil must travel faster than the air traveling under the lower camber. Thus, a difference in pressure is formed where the air traveling over the upper camber is at a lower pressure than the air traveling under the lower camber. This results in a lift force on the blade, which induces a torque about the rotor axis, causing the turbine to rotate. Thus, energy is extracted from this torque on the wind turbine blades.

Several factors contribute to the efficiency of a wind turbine system. The one important factor is the length of the blades, as the total power that can be extracted is proportional to the disk area swept by the rotor blades as they rotate, which is proportional to the square of the blade length. Other factors include the ability of the control system to maintain the optimal tip speed ratio. Factors such as low blade weight and low rotational inertia of the rotor make it easier for the control system to maintain the ratio between wind speed and blade rotation speed, increasing and decreasing the rotor speed as wind speeds fluctuate.

One obstacle to the development of longer wind turbine blades necessary to increase the disk area and power production is the rapid increase in blade weight as the blade length increases. As blade length increases, the loads on the blade increase rapidly. A longer blade is also more flexible than a shorter blade. In order to resist the increased loads and to provide the required stiffness, a significant amount of additional material must be added to longer blades to maintain structural integrity. The addition of material increases blade material cost, as additional material must be purchased and processed. Additional weight in a wind turbine blade is detrimental because it increases certain loads on the hub and generator systems due to the increased rotational inertia of the rotor disk, and the increased gravity loads on the blades. Furthermore, additional weight can be detrimental because it can cause a reduction in the natural vibration frequencies of the blades, potentially causing undesirable interactions with the airstream and/or the dynamics of the tower and support structure.

Therefore, any method making more efficient blade structure has the potential to reduce the material cost, and to allow larger blades to be built. In some cases, these larger blades may be combined with existing generators, allowing additional power to be generated, especially in low wind speed areas. This is important, as a large fraction of the United States has relatively low wind speeds. Furthermore, since the wind speed at a given location varies with time, the use of a larger blade may lower the minimum wind speed at which a turbine can be profitably operated, allowing turbines at a given site to be generating power a larger fraction of the time. This can result in a significant reduction in the overall cost of energy from wind turbines.

For instance, some of the first wind turbines were constructed of wood and canvas sails because of their affordability and easy construction. However, wood and canvas materials require a lot of maintenance over their service life. Also, their shape was associated with a low aerodynamic efficiency creating a relatively high tried for the force they were able to capture. For these reasons, wind turbine blades were replaced with a solid airfoils structures.

Other older style wind turbines were designed with relatively heavy steel components in their blades (such as steel girders, cross bars, and ribs), which produced a higher rotational inertia. While improved in aerodynamic efficiency, structural durability and maintenance, the speed rotations in heavy steel blades required governance by an alternating current frequency of the power source to buffer the changes in rotation speed to thus, make power output more stable. Furthermore, the weight of steel becomes economically prohibitive in designing longer blades capable of rotating in large arcs within the low-speed wind areas.

Subsequent methods of forming wind blade airfoils involved using aircraft construction techniques. These techniques included using heavy balsa wood laid across the main metal or wood bar of a blade running down the length of the blade. Many of these types of blades used a set of ribs providing chord wise support and maintaining airfoil shape. Skins of sheet metal were riveted to the rigid ribs therein to provide the aerodynamic surface. While lighter than primarily steel blades, these designs still suffer from the shortcomings associated with the economics of weight per blade unit length of components.

Currently, wind turbine blade fabrication mimics the same techniques used in boat building and surfboard construction. Some current conventional wind turbine blades are manufactured at a length approximately 100 to 150 feet long. Materials of choice are commonly fiberglass with epoxy resin forming airfoils using wet layup techniques. The blades are fabricated in large costly "clamshell" molds where skins and heavy glass balsa panel cores are laid up manually. Such solid fiberglass structures are relatively heavy for a 31 meter blade (approximately 12,000 pounds) and require expensive tooling for full-scale heated molds.

Other more sophisticated techniques include a turbine with blades that can be twisted in response to variable torque forces. A device of this type can be seen in U.S. Pat. No. 5,284,419 to Lutz.

It can be seen therefore, that a need exists in the art for a wind turbine blade made from sturdy construction capable of withstanding sudden wind loads yet, is lightweight, economical, and materially efficient for production in longer lengths capable of generating power in low wind speed areas. Additionally, a need exists for such a blade that can be readily disassembled for shipment in standard transportation containers and readily assembled on site.

SUMMARY OF THE INVENTION

Briefly and in general terms, the wind turbine blade of the present invention includes an internal truss support structure comprising a set of ribs with perimeter edges including flanges and attachment fixture points, the ribs aligned in parallel and laterally spaced from one another on their edge forming a spine. The ribs are connected together by composite spar and cross members. The spar members are attached along the spine to the perimeter edges of respective ribs along the attachment fixture points. Likewise, the cross members are bonded between adjacent ribs with at least one cross member passing through the gaps between adjacent ribs and attached to spar members at respective attachment fixture points forming a series of truss joints. The truss support structure is then covered by an airfoil skin attached onto to the flanges of the ribs.

Other features and advantages of the invention will become apparent from the following detailed description, taken in conjunction with the accompanying drawings which illustrate, by way of example, the features of the invention

BRIEF DESCRIPTION OF THE DRAWINGS

FIG. 3 is an enlarged sectional view of the circle 3 shown in FIG. 2;

FIG. 4 is a top view of the truss support structure shown in FIG. 2;

FIG. 5 is a front view of the truss support structure shown in FIG. 2;

FIG. 6 is an enlarged sectional view representation of a portion of a second embodiment of the truss support structure shown in FIG. 2;

FIG. 6A is an enlarged sectional perspective view of a splice joint shown in FIG. 6;

DETAILED DESCRIPTION OF THE PREFERRED EMBODIMENTS

There are some landscapes where the windspeed is too low for some wind turbine blades to harvest the surrounding air. In many instances, the blades are unable to harvest the air and rotate about their turbine axis because the blades are too heavy and/or to short to effectively capture relatively low-speed winds. At the heart of some overweight and undersized wind turbine blades is a core support structure that is inefficiently designed to provide weight and low rotational inertia suitable for capturing energy in low wind speed areas. As described herein, Applicants have invented a new wind turbine blade utilizing a core support structure which provides a blade of reduced weight which still meets the structural needs or requirements of a turbine blade.

Figure 1:
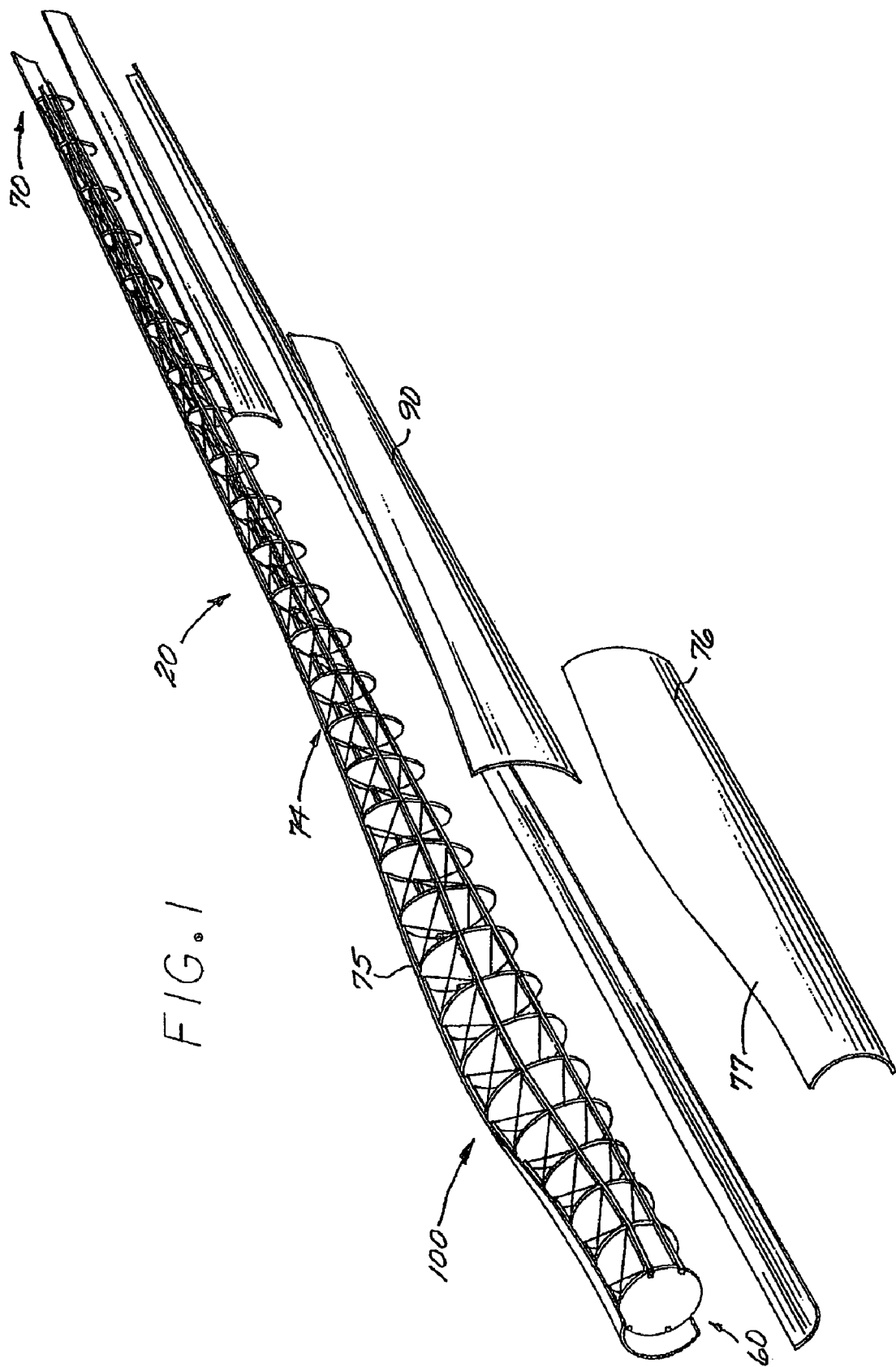
FIG. 1 is a partially exploded perspective view of a first embodiment of the wind turbine blade illustrating the internal truss support structure.

As shown in FIG. 1, the wind turbine blade 100 of the subject invention includes a relatively lightweight airfoil that exploits the efficiency of a substantially lightweight composite support truss structure 20 which extends axially lengthwise from a root attachment section 60 to a tip 70. The support truss structure 20 is covered by an assembly of skins 90 forming the basic airfoil shape of the blade 100. The skins 90 include in the chord-wise direction of the blade 100 a leading edge 74 and a trailing edge 76. The upper camber of the blade 100 is designated 75 and the lower camber is designated 77. In an exemplary model, the assembled blade 100 is approximately 31 meters from root attachment section 60 to tip 70, however, it is understood that the blade can be lengthened according to the needs of the wind generation site.

Figure 2:
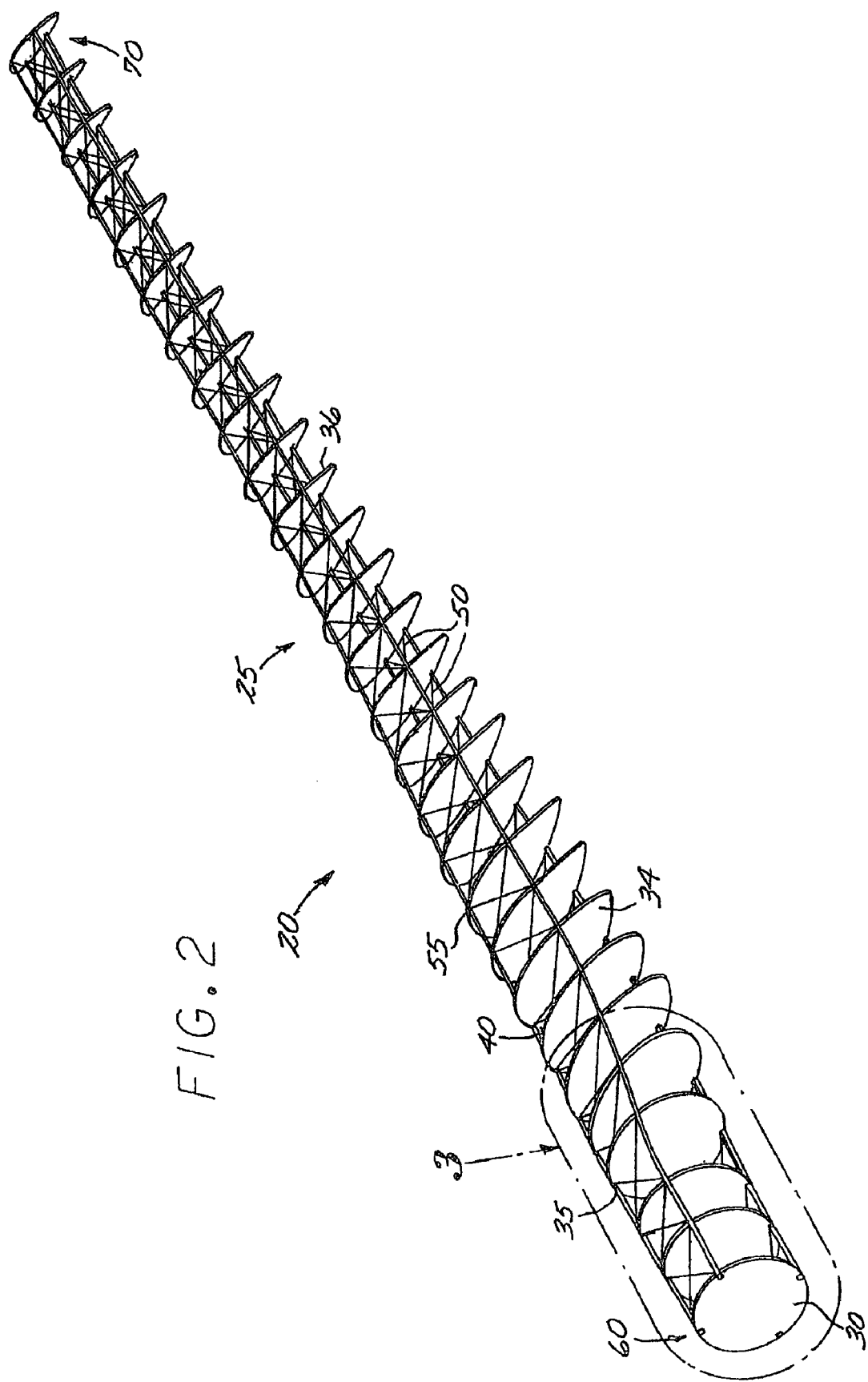
FIG. 2 is a perspective view of the truss support structure shown in FIG. 1.

As seen in FIG. 2, the core of the wind turbine blade is comprised of a support truss structure 20 that is formed by a series of laterally spaced ribs 30 that are oriented generally parallel to the broad face 34 of one another along the longitudinal lengthwise axis of the wind turbine blade 100 forming a spine 25 and defining the general airfoil shape. The ribs 30 are connected in support to one another by a plurality of connected composite spar members 40 and cross members 50 commencing attachment and support from a first rib 30 at the root attachment section end 60 and terminating at an end rib 30 located at the tip 70. As seen in detail in FIG. 3, a first preferred embodiment includes four spar members 40 join the series of ribs 30 together at their outer perimeter edges 36 connected to the ribs at rib bonding fixtures 35, providing longitudinal support to adjacent ribs. Connecting in support therebetween are a plurality of cross members 50. Referring to FIGS. 3-5, the cross members 50 essentially comprise four members crossing between adjacent ribs 30 with two of the cross members connected to adjacent ribs in the chord-wise direction while the two other members support attachment to adjacent ribs in the camber direction of the spine 25.

Those skilled will recognize that the ribs 30 provide the basic airfoil shape of the blade 100. The ribs 30 are fabricated preferably lightly loaded with a lightweight material such as a balsa core sandwiched on either side with another light weight material such as fiberglass and formed as flat panels approximately one inch thick with flanges 37 incorporated around their perimeter. In the exemplary blade model, the ribs 30 are spaced parallel approximately 1 meter apart providing the primary support for the skin panels 90 bonded to the rib perimeter edges 36 on the flanges 37 for attachment of the skins 90 thereto. It will be understood that as different portions of blade surfaces change curvature, the individual ribs 30 are molded to the shape and support necessary for each segment.

The spar members 40 and cross members 50 are fabricated of cylindrically pultruded composite material pre-cured when assembled. Truss joints 55 are formed where respective spar members 40 and cross members 50 intersect at respective bonding fixture points 35 along the perimeter edge 36 of individual ribs 30. As seen in FIGS. 2-5, spar members 40 run continuously and essentially longitudinally straight along the perimeter tangent of the spine 25 from root attachment section 60 to tip 70. Likewise, cross members 50 comprise four continuously running members weaved diagonally across the longitudinal axis of the spine between adjacent ribs 30 in the chord and camber directions of the spine 25 connected to respective truss joints 55 from root attachment section 60 to tip 70. In a blade measuring approximately 31 meters, approximately 120 joints are formed using such a configuration.

Figure 7:
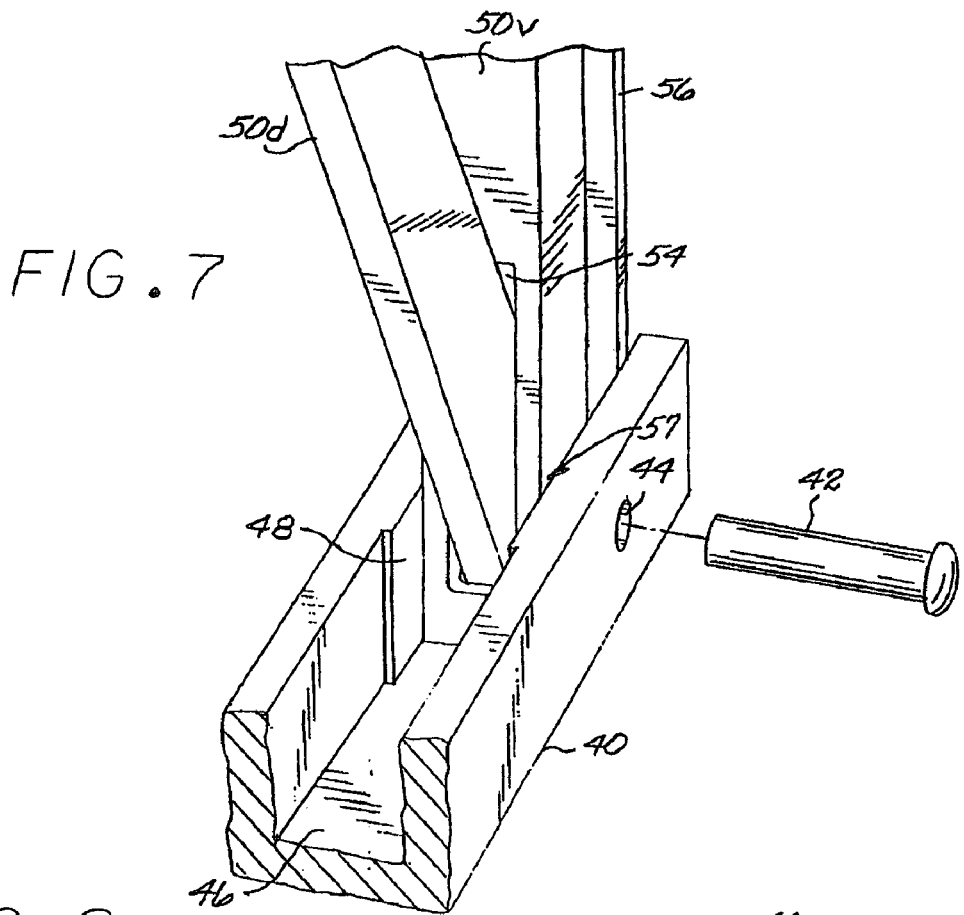
FIG. 7 is an enlarged sectional perspective view of a joint shown in the truss support structure shown in FIG. 6.
Figure 8:
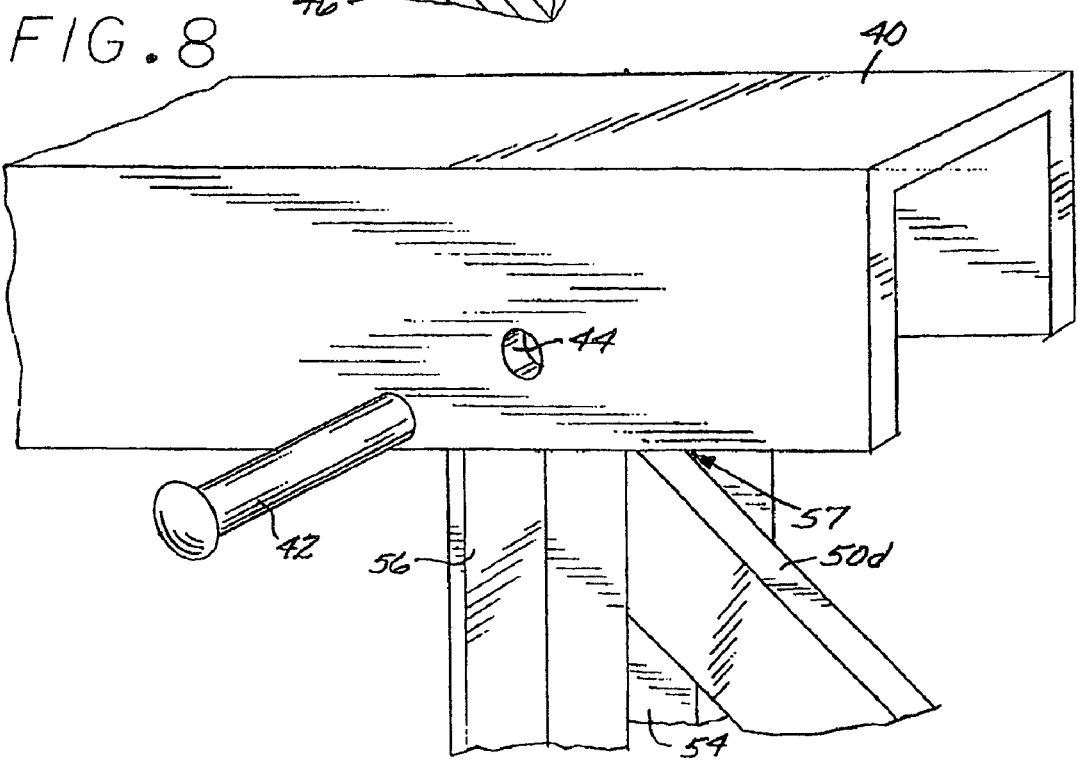
FIG. 8 is an enlarged sectional front view of a joint shown in the truss support structure shown in FIG. 6.

Referring to FIGS. 6-8, a second truss formation is shown. In this second preferred embodiment, the truss support structure 20 is modified by reconfiguring the cross members 50 to cooperate with the spar members 40 forming a series of triangular truss joints 57. In this embodiment, the cross members 50 are re-designated individually as diagonal members 50d and as vertical members 50v for the sake of descriptive simplicity, but are for all intents and purposes are materially equivalent to the cross members 50 as shown in FIGS. 1-5. It will be understood that member 50v refers to those cross members that are connected vertically between vertically adjacent spar members 40 and cross members designated 50d refer to those cross members that intersect and diagonally join two adjacent cross members 50v.

Referring specifically to FIG. 6, the drawing depicts a section of the spine 25 showing a parallel set of three consecutive truss joints 57 where a rib is represented by the rib plane RP. The section of spine 25 shown in this embodiment is similar to the embodiment shown in FIGS. 1-5 except that the truss structure 20 is configured to form two parallel series of vertical joints from root attachment section 60 to tip 70. It will be understood according to this drawing that a rib would be attached to parallel running vertical members 50v on their flanges 56. In this embodiment, an alternate joint embodiment is formed by incorporating an alternative truss joint 57 of individual members 50v, 50d and 40. If necessary, additional diagonal members could be added attaching the leading truss section to the tailing truss section.

Unlike the first embodiment, the cross members 50v and 50d are formed as individual and potentially interchangeable components disconnected from like components along the length of the truss structure 20. In this embodiment, two joints 57 are formed between a pair of ribs when a diagonal member 50d intersects the upper end of a vertical member 50v and the lower end of an adjacent vertical member 50v connected along the same set of upper and lower spar members 40. Referring to FIGS. 7 and 8, spar members 40 include a U-shaped channel 46 running from end to end with a width large enough to accommodate the end of a vertical member 50v. One end of respective vertical members 50v incorporate a slot 54 accommodating the end thickness of an intersecting diagonal member 50d. Individual composite support members further include bores 44 centrally aligned at the joints 57 for insertion of a bolt or pin 42. The joint 57 can be further strengthened by inserting metal plates 48 within the channels 46 on both sides of a vertical member 50v. The vertical members 50v further include a flange 56 on the member sides for bonding receipt of respective ribs to the flanges.

It will be appreciated that as individual and potentially interchangeable components, the ribs 30, vertical members 50v and diagonal members 50d, and skins 90 can be separated for storage and transported in a standard 40 foot shipping container and that the blade 100 parts lend themselves to efficient disassembly and reassembly on site. Referring to FIGS. 6 and 6A, when desirable, the truss support structure 20 can include modified spar members 40 that are constructed in intervals less than 40 feet long to accommodate transportation of a disassembled blade 100. When assembling the spar members 40 to the ribs 30, structural unity and integrity can be preserved by forming splice joints 45 at the ends of respective spar members 40 intermediate any truss joints 57. In such instances, respective spar member ends include a plurality of bores 43 in the spar member side walls aligned from one another across the U-shaped channel 46. A bridging member 48 made from steel or other similarly strong material is press fit within the U-shaped channel 46 traversing and splicing together the respective ends of two axially adjacent spar members 20. The bridging member 48 also includes bores 43 aligned with respective bores in the spar members 40. The respective spar member ends are then secured and bonded together by inserting pins 44 through respective aligned bores of the spar 40 and bridging members 48 forming the splice joint 45. The size of the bridging member 48 is kept to a minimum preserving the lightweight features of the truss structure 20 while maintaining the load capacities on the sectionalized spar members 20. Additionally, the spar members 40 are terminated in lengths such that their splicing together is performed at predetermined distances intermediate from any truss joints 57 so as to preserve respective joint integrities.

Figure 9:
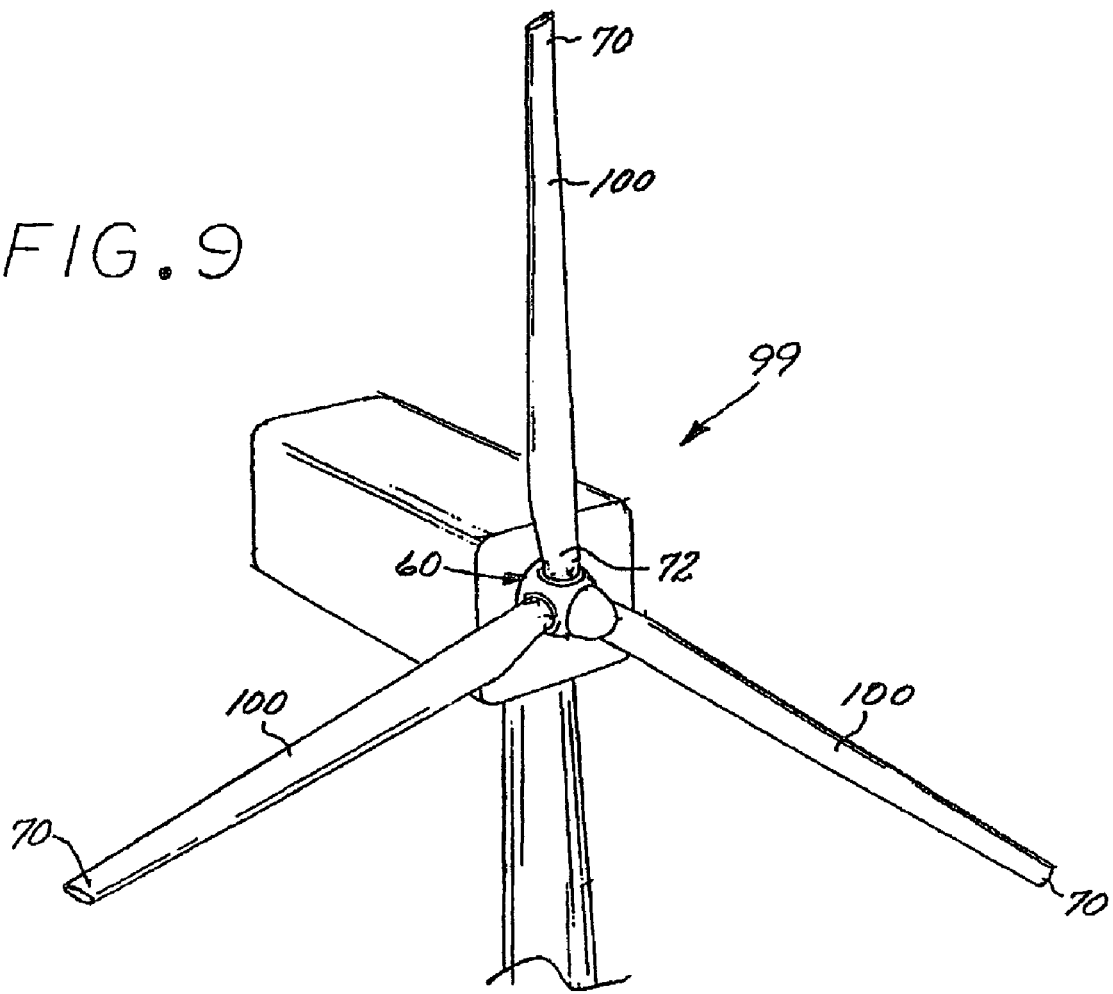
FIG. 9 is a sectional perspective view depicting a wind turbine incorporating the present invention.
Figure 10:
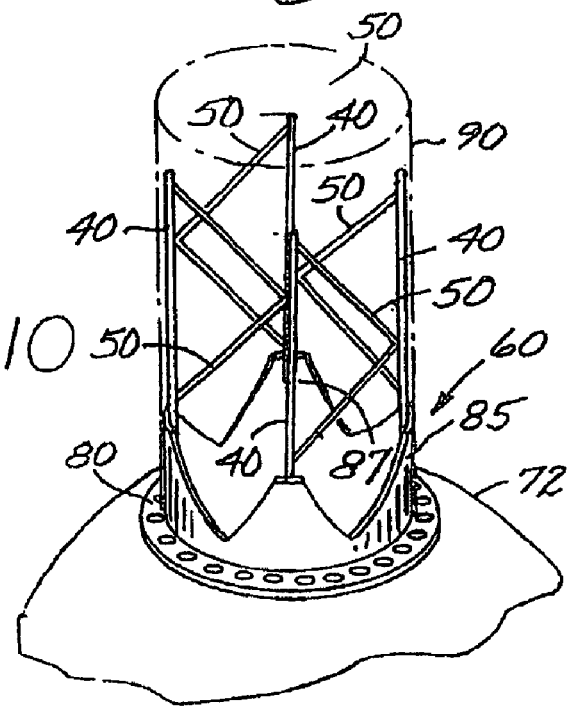
FIG. 10 is an enlarged sectional front view of the invention shown in FIG. 9.

Once assembled, the turbine blade 100 affords a sturdy yet lightweight airfoil structure readily attachable to commercial wind turbines 99 as seen in FIGS. 9 and 10. The skin panels 90 are constructed of flat-panel fiberglass which can be manufactured in bulk and shaped therefrom or alternatively, the truss structure 20 can be covered in a fabric fitted over the areas of varying curvature which fabric can then be hardened with a resin to finish the blade airfoil. In constructing the blade, the skins 90 are wrapped around the truss structure 20 and fastened to the ribs 30 on each rib perimeter edge 36 to the flanges 37, (FIGS. 1-3). Those skilled will understand that any conventional bonding technique such as adhesive bonding or the use of mechanical fasteners are suitable for attaching the skins 90 to the ribs 30. Additionally, it will be appreciated that where the ribs 30 define areas of high curvature, the skin panels 90 can span across a single pair of ribs. However, in areas of low curvature, several ribs can be covered by a larger section of the skin panel 90. Once the skins 90 are mounted and bonded to the truss structure 20, the skin 90 behaves as a single continuous skin and hence may support the internal components of the blade 100 as a unitary structure that can be mounted from the root attachment end 60 for transferring wind loads to a hub 72 (FIGS. 9 and 10).

The root attachment end 60 maintains compatibility with current wind turbine hubs by including a steel mounting ring 80 incorporating a collar 85 with four hard points 87 projecting outward from the collar. The four spar members 40 are attached to the interior of the hard points. The skins 90 are draped over the spar members 40, hard points 87 and collar 85. The assembled section end 60 is secured onto the wind turbine 99 by bolting the mounting ring 80 to the hub 72 using bolts. Once mounted, the spar members 40 are the primary load carriers while the continuous skin 90 at the root attachment end 60 carries the load for transfer to the hub 72.

In operation, as wind comes across the blade 100 surface, the wind force acts on the blade producing a torque about the hub causing the blade to rotate. As the blade 100 rotates, shear and bending forces act on the blade as it continues through its circular path. Those skilled will recognize that as forces act on the blade, the spar members 40 will carry the bulk of the bending force loads while cross members 50 will provide the shear and torsional support. Thus, the truss structure 20 described can be either utilized to produce a lighter blade of standard length (e.g. approximately 100 feet), or can be used to produce longer blades with weight comparable to current designs which can harvest wind from a greater arc area of rotation.

It will be appreciated that by using composite components in the truss structure 20, sufficient strength performance and fatigue resistance is achieved while providing rigid support of the blade in a relatively low density structure. By using composite spar members 40 and/or cross members 50, such lightweight components constitute the primary load paths in truss joints 55 in cooperation with laterally spaced ribs 30. Additionally, by using a fabrication that results in highly unidirectional to fabricate the support members, the fibers are aligned straight along the axial direction of fabrication, thus providing reinforcement and homogenous strength within the member. Thus, a supported and reinforced structure is described that provides relatively ample sections of empty space within the blade 100 producing less material weight per unit length. Overall, the weight of a 100 foot blade using the proposed truss structure 20 could weigh as little as 6,000 pounds (compared to the 12,000 pounds of the current conventional fiberglass blade) resulting in up to a 50% weight reduction over some fiberglass blades. It will be understood that where reinforcement of the blade is desired additional cross members 50 and spar members 40 can be added for load path redundancy without significantly contributing to the overall weight of the blade 100.

Also, current conventional fiberglass blades are considered by some too heavy and inefficient to generate power when fabricated at lengths above 100 feet. In contrast, the weight per unit length of the blade 100 is relatively light, and the wind mill 99 can also benefit from blades 100 constructed of longer lengths which can cover a greater sweeping arc area of wind while maintaining lesser weight loads. In areas of low wind power, longer blades rotating in a greater arc may harvest more wind and therefore generate more power. It will also be appreciated that the light weight of the blade 100 exerts less of a weight load on the hub 72, and thus, less stress is placed on the hub, turbine, bearings, and tower. Wind mills 99 incorporating blades 100 will be expected to produce up to five megawatts of power while operating at a net cost of energy reduction on the order of 30%-40%.

Figure 11:
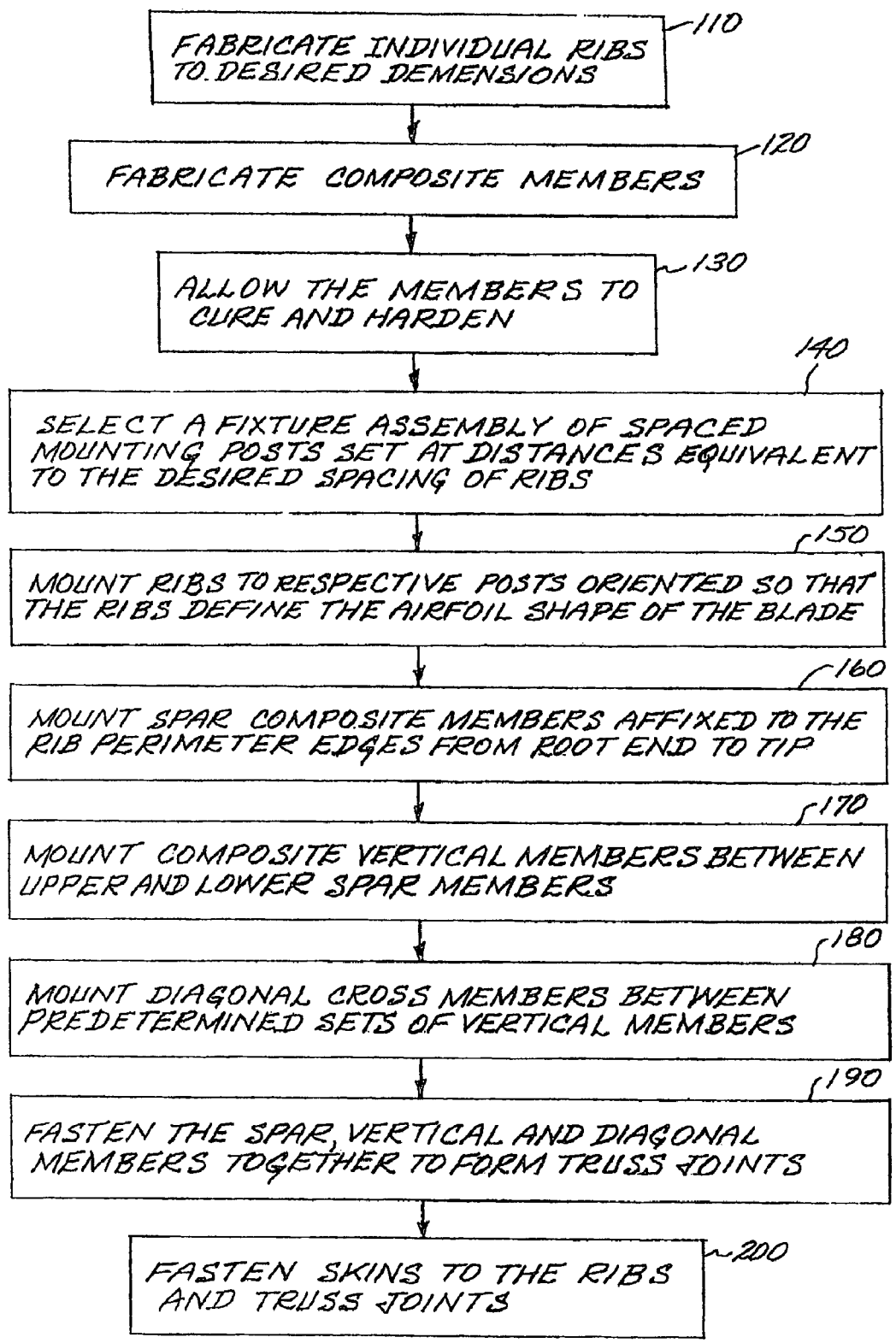
FIG. 11 is a block diagram describing a method of fabricating the invention shown in FIG. 1.
Figure 12:
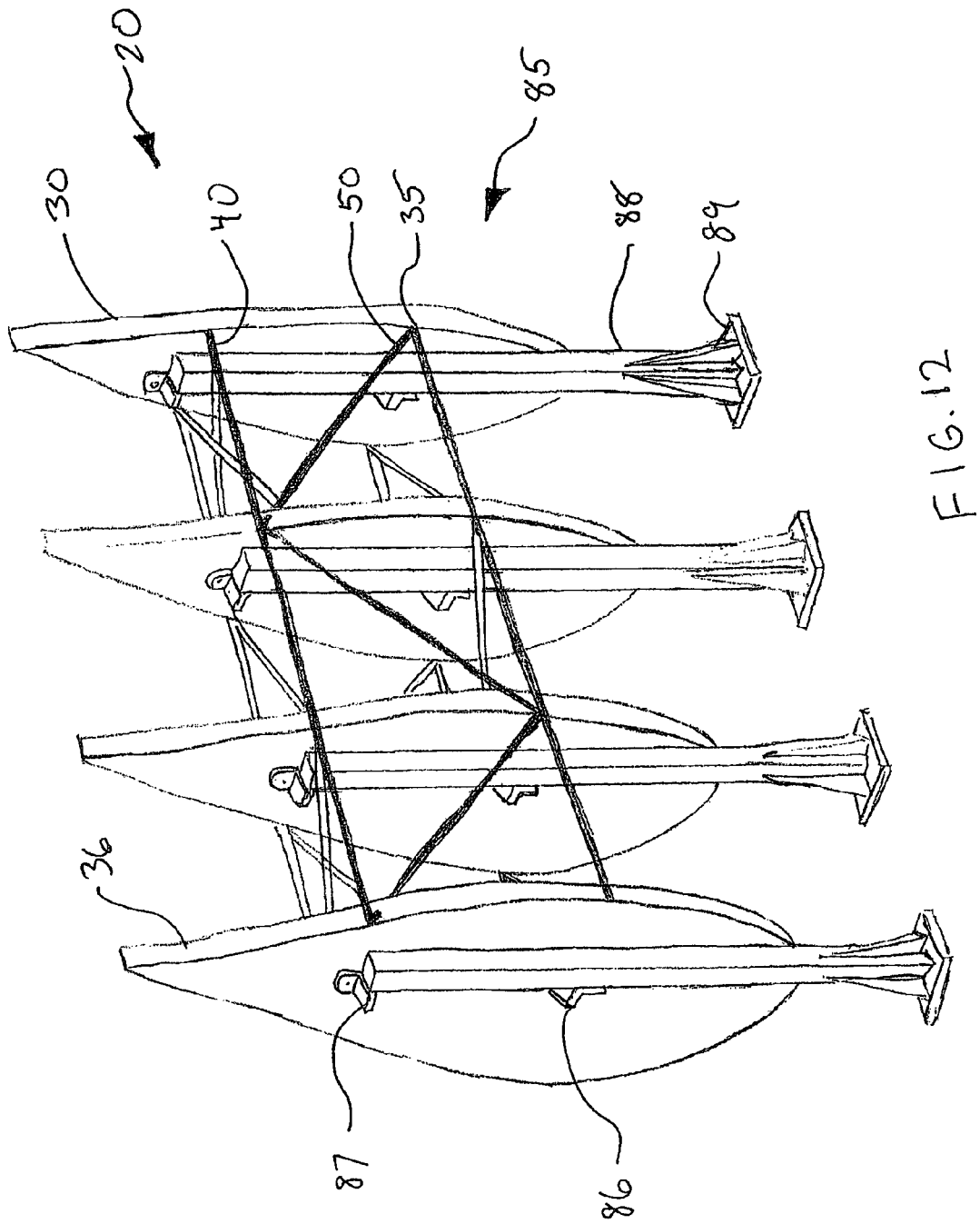
FIG. 12 is a perspective view of an example assembly fixture described in the diagram of FIG. 11.

The proposed invention also lends itself to an economic process for manufacturing wind turbine blades. Referring to FIGS. 11 and 12, a process is described that incorporates selecting a congregation of ribs 30 aligned to define the shape of the blade. Composite parts are fabricated and pre-cured before assembly. A set of posts 88 are spaced on the ground or on a fixture to a predetermined distance and the ribs 30 are mounted to the posts. Composite spar members 40 are then affixed from the root to the tip along the rib perimeter edges 36 to mounting fixtures 86 and 87. Then, beginning from the root and moving out to the tip, composite cross members 50 are attached between upper and lower running spars 40 forming the truss joints 55. A skin is then applied to the truss structure 20 finishing the blade. The skins can be fabricated from thin biaxial prepreg fiberglass (approximately 2 plies)

cut into shape or by applying a fabric over the structure which is then heat shrunk to an aerodynamic fit and coated with a resin.

As described herein, the blade 100 of the present invention demonstrates a new and useful structure that provides a lightweight sturdy construction useful for producing energy efficient power generation.

We claim:

1. A wind turbine blade, comprising:
   a wind turbine blade skin having a low pressure surface facing in a first direction and a high pressure surface facing in a second direction opposite the first direction;
   a plurality of spaced-apart wind turbine blade rib panels positioned within the skin;
   multiple spars extending between neighboring rib panels in a spanwise direction, wherein at least one of the spars is curved in two directions transverse to the spanwise direction; and
   multiple cross members extending diagonally between spars, with the ribs, spars and cross members forming a truss structure.

2. The wind turbine blade of claim 1 wherein the at least one spar is curved in a chordwise direction and in a camber direction.

3. The wind turbine blade of claim 1 wherein the at least one spar is one of four spars positioned within the wind turbine blade skin.

4. The wind turbine blade of claim 1 wherein at least one of the spars has a first portion connected to a second portion at a spar joint.

5. The wind turbine blade of claim 1 further, comprising:
   a circular mounting ring; and
   a transition structure connected between the truss structure and the mounting ring, wherein the spars are attached to the transition structure.

6. A wind turbine blade, comprising:
   a wind turbine blade skin;
   a plurality of wind turbine blade ribs positioned within the skin;
   a plurality of spars extending between neighboring ribs in a spanwise direction, at least one of the spars having a first portion connected to a second portion at a spar joint; and
   a plurality of cross members extending diagonally between the spars, with the ribs, spars and cross members forming a truss structure.

7. The wind turbine blade of claim 6 wherein the spar joint includes a splice joint.

8. The wind turbine blade of claim 6, further comprising a bridging member attached to both the first and second portions of the at least one spar at the spar joint.

9. The wind turbine blade of claim 8 wherein the bridging member is bolted to the first and second portions.

10. The wind turbine blade of claim 6 wherein the first and second portions of the at least one spar are connected with bolts.

11. The wind turbine blade of claim 6 wherein individual cross members are attached to individual spars at truss joints and wherein the spar joint is located between and spaced apart from neighboring truss joints.

12. The wind turbine blade of claim 6 wherein spar joint is located between and spaced apart from neighboring wind turbine ribs.

13. The wind turbine blade of claim 6 wherein an individual rib includes a recess and wherein an individual spar is received in the recess of the rib.

14. The wind turbine blade of claim 13 wherein an outer surface of the individual spar is generally flush with an outer surface of the individual rib.

15. The wind turbine blade of claim 6 wherein the skin includes multiple skin sections carried by the truss structure.

16. The wind turbine blade of claim 6 wherein at least one of the cross members includes a slot and a through-hole that extends generally transverse to the slot, and wherein the cross member is coupled to the rib with a fastener that passes through the through-hole.

17. A wind turbine blade, comprising:
   a wind turbine blade skin having a tip region and a root attachment region;
   a plurality of wind turbine blade ribs positioned within the skin;
   a plurality of spars extending between neighboring ribs in a spanwise direction;
   a plurality of cross members extending diagonally between the spars, with the ribs, spars and cross members forming a truss structure;
   a generally circular mounting ring; and
   a transition structure connected between the truss structure and the mounting ring, wherein the spars are attached to the transition structure.

18. The wind turbine blade of claim 17 wherein the transition structure includes a collar attached to the ring, the collar having reinforced regions projecting away from the ring, and wherein the spars are attached to the hard points.

19. The wind turbine blade of claim 18 wherein the reinforced regions include hard points.

20. The wind turbine blade of claim 17 wherein the plurality of spars includes four spars.

21. The wind turbine blade of claim 17 wherein the mounting ring includes mounting holes positioned to bolt the mounting ring to a wind turbine hub.

22. The wind turbine blade of claim 17 wherein at least part of the transition structure tapers as it extends from away from the spar and towards the mounting ring.

23. The wind turbine blade of claim 22 wherein the tapering part of the transition structure includes a fan-shaped portion that has an increasing circumferential extent as extends away from the spar and toward the mounting ring.

* * * * *

UNITED STATES PATENT AND TRADEMARK OFFICE
CERTIFICATE OF CORRECTION

| | | |
|---|---|---|
| PATENT NO. | : 7,891,950 B2 | Page 1 of 1 |
| APPLICATION NO. | : 12/411259 | |
| DATED | : February 22, 2011 | |
| INVENTOR(S) | : Myles L. Baker et al. | |

It is certified that error appears in the above-identified patent and that said Letters Patent is hereby corrected as shown below:

On Sheet 7 of 8, Box 110, Figure 11, line 2, delete "DEMENSIONS" and insert -- DIMENSIONS --, therefor.

In column 1, line 44, delete "meeting the for.".

In column 2, line 8, delete "the converts" and insert -- that converts --, therefor.

In column 4, line 36, after "invention" insert -- . --.

In column 5, line 12, delete "to short" and insert -- too short --, therefor.

In column 9, line 31, in Claim 5, delete "claim 1 further," and insert -- claim 1, further --, therefor.

Signed and Sealed this
Twenty-sixth Day of April, 2011

David J. Kappos
*Director of the United States Patent and Trademark Office*